United States Patent
Yang (10) Patent No.: US 12,547,336 B2
(45) Date of Patent: Feb. 10, 2026

(54) CONTROL METHOD OF MEMORY DEVICE AND ASSOCIATED FLASH MEMORY CONTROLLER

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

(*) Notice: Subject to any disclaimer, the term of this patent is extended or adjusted under 35 U.S.C. 154(b) by 7 days.

(21) Appl. No.: 18/128,244

(22) Filed: Mar. 30, 2023

(65) Prior Publication Data
US 2024/0329871 A1 Oct. 3, 2024

(51) Int. Cl.
*G06F 3/06* (2006.01)
(52) U.S. Cl.
CPC .......... *G06F 3/0652* (2013.01); *G06F 3/0604* (2013.01); *G06F 3/064* (2013.01); *G06F 3/0679* (2013.01)
(58) Field of Classification Search
CPC ...... G06F 3/0652; G06F 3/0604; G06F 3/064; G06F 3/0679
See application file for complete search history.

(56) References Cited

U.S. PATENT DOCUMENTS

| 10,216,422 | B2 | 2/2019 | Kim | |
|---|---|---|---|---|
| 2016/0313943 | A1* | 10/2016 | Hashimoto | G06F 16/1847 |
| 2019/0179563 | A1* | 6/2019 | Lee | G06F 3/0647 |
| 2020/0293221 | A1* | 9/2020 | Jang | G06F 12/0246 |
| 2022/0091984 | A1* | 3/2022 | Das | G06F 3/0616 |
| 2024/0094932 | A1* | 3/2024 | Kantani | G06F 3/0644 |

FOREIGN PATENT DOCUMENTS

| CN | 110377538 B | 3/2021 |
|---|---|---|
| CN | 109240941 B | 12/2021 |
| TW | 1673607 B | 10/2019 |
| TW | 202217576 A | 5/2022 |

* cited by examiner

Primary Examiner — Eric Cardwell
(74) Attorney, Agent, or Firm — Winston Hsu (57) ABSTRACT

The present invention provides a control method of a flash memory controller, wherein the flash memory controller is configured to access a flash memory module, and the flash memory module includes a plurality of blocks. The control method includes the steps of: obtaining a read count of a specific block; obtaining a time stamp of the specific block, wherein the time stamp is a write time of the specific block; calculating a time difference between a current system time and the time stamp of the specific block; and using the read count of the specific block and the time difference, and referring to a read count and threshold time mapping table to determine whether to arrange the specific block in a garbage collection pool.

15 Claims, 6 Drawing Sheets

| Block number | Read count |
|---|---|
| B1 | 1000000 |
| B2 | 30000 |
| B3 | 10000 |
| B4 | 100 |
| ⋮ | ⋮ |

CONTROL METHOD OF MEMORY DEVICE AND ASSOCIATED FLASH MEMORY CONTROLLER

BACKGROUND OF THE INVENTION

1. Field of the Invention

The present invention relates to a flash memory controller.

2. Description of the Prior Art

A flash memory can be used to store data through electrical erase and write/program, and is widely applied in the field of memory cards, solid-state drives, portable multimedia players, etc. Because the flash memory is a non-volatile memory, there is no need for extra power to maintain what is stored in the flash memory. In addition, the flash memory provides high speed data access and excellent vibration resistance, which explains its popularity.

The flash memories can be classified into two categories: NOR flash memories and NAND flash memories. For the later, the erase time and program time is shorter, and the die size of each memory cell is smaller. Thus, compared with the NOR flash memory, the NAND flash memory permits higher storage density and lower cost per bit. Generally speaking, the flash memory consists of memory cell arrays, wherein each memory cell is implemented using a floating-gate transistor in practice, and the threshold voltage of the memory cell is configured by properly controlling charge number at a floating gate of the floating-gate transistor to thereby store a single-bit data or a multi-bit data. Therefore, when one or more predetermined control gate voltages are imposed at the control gate of the floating-gate transistor, a conduction status of the floating-gate transistor will indicate one or more binary digits stored in the floating-gate transistor.

However, due to certain reasons, the original charge number of the flash memory may be affected/disturbed. For instance, the disturbance mainly come from retention disturbance and read disturbance, and a number of charges stored in the flash memory may changes due to high temperature. Hence, threshold voltage distribution of memory cells of the flash memory may change by the effect of retention time and/or temperature, and the data read from the memory cells may be erroneous since the threshold voltage distribution may be different from the original threshold voltage.

SUMMARY OF THE INVENTION

It is therefore an objective of the present invention to provide a control method of a flash memory controller, which can determine blocks that may encounter read disturbance issue, and arrange these blocks for garbage collection operation, to solve the above-mentioned problems.

According to one embodiment of the present invention, a control method of a flash memory controller is disclosed, wherein the flash memory controller is configured to access a flash memory module, and the flash memory module comprises a plurality of blocks. The control method comprises the steps of: obtaining a read count of a specific block; obtaining a time stamp of the specific block, wherein the time stamp is a write time of the specific block; calculating a time difference between a current system time and the time stamp of the specific block; and using the read count of the specific block and the time difference, and referring to a read count and threshold time mapping table to determine whether to arrange the specific block in a garbage collection pool.

According to one embodiment of the present invention, a flash memory controller comprising a read only memory and a microprocessor is disclosed, wherein the flash memory controller is configured to access a flash memory module, the flash memory module comprises a plurality of blocks. The read only memory is configured to store a code, and the microprocessor is configured to execute the code for controlling access of the flash memory module. The microprocessor is configured to perform the steps of: obtaining a read count of a specific block; obtaining a time stamp of the specific block, wherein the time stamp is a write time of the specific block; calculating a time difference between a current system time and the time stamp of the specific block; and using the read count of the specific block and the time difference, and referring to a read count and threshold time mapping table to determine whether to arrange the specific block in a garbage collection pool.

According to one embodiment of the present invention, a memory device comprising a flash memory module and a flash memory controller is disclosed. The flash memory module comprises a plurality of blocks, and the flash memory controller is configured to access the flash memory module. The flash memory controller is configured to perform the steps of: obtaining a read count of a specific block; obtaining a time stamp of the specific block, wherein the time stamp is a write time of the specific block; calculating a time difference between a current system time and the time stamp of the specific block; and using the read count of the specific block and the time difference, and referring to a read count and threshold time mapping table to determine whether to arrange the specific block in a garbage collection pool.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
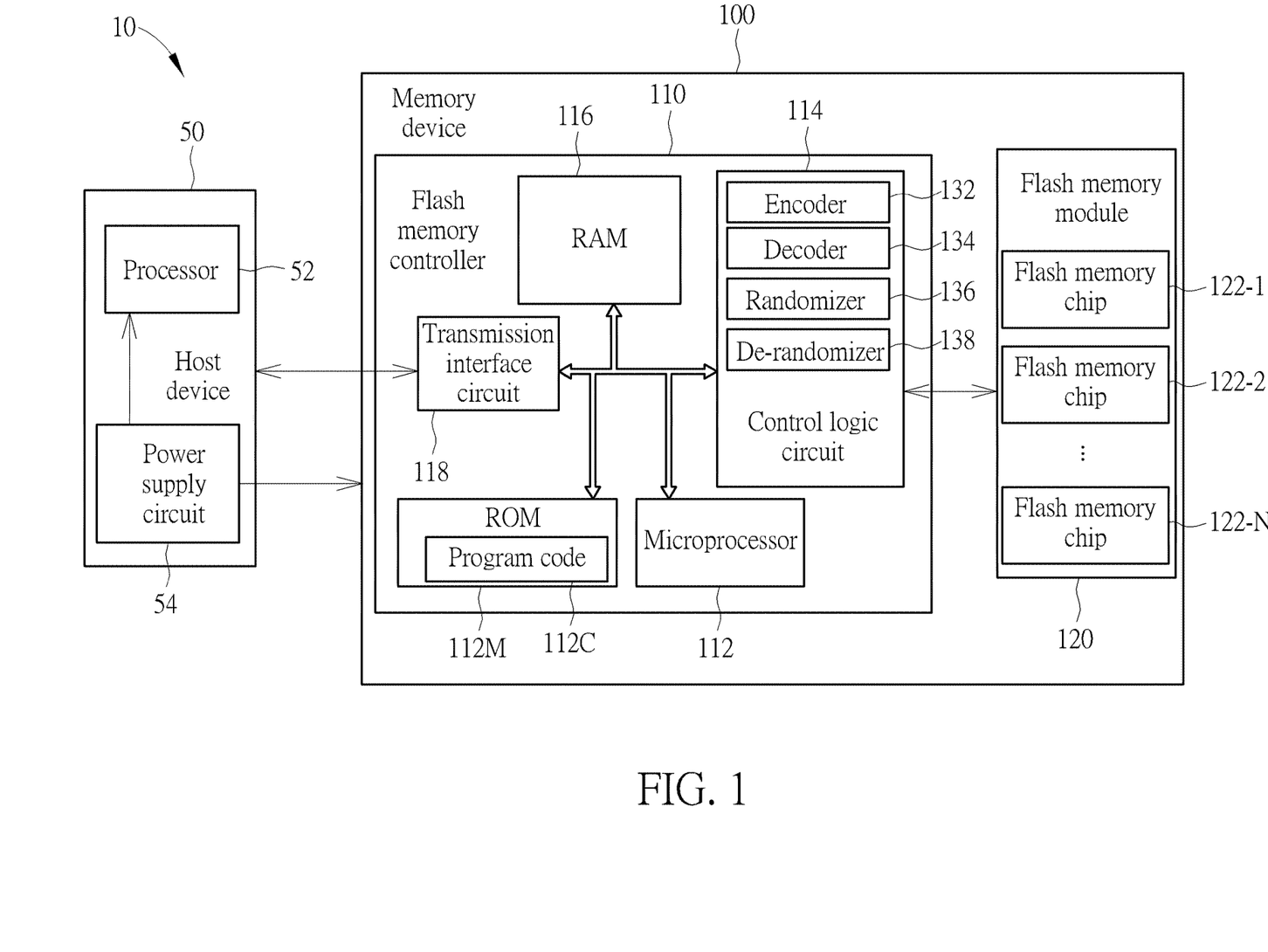
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, and a personal computer such as a desktop computer and a laptop computer. Examples of the memory device 100 may include, but are not limited to: a solid state drive (SSD), and various types of embedded memory devices such as that conforming to Peripheral Component Interconnect Express (PCIe) specification, etc. According to this embodiment, the memory device 100 may comprise a flash memory controller 110, and may further comprise a flash memory module 120, where the flash controller 110 is arranged to control operations of the memory device 100 and access the flash memory module 120, and the flash memory module 120 is arranged to store information. The flash memory module 120 may comprise at least one flash memory chip such as a plurality of flash memory chips 122-1, 122-2, . . . , and 122-N, where "N" may represent a positive integer that is greater than one.

As shown in FIG. 1, the flash memory controller 110 may comprise a processing circuit such as a microprocessor 112, a storage unit such as a read-only memory (ROM) 112M, a control logic circuit 114, a RAM 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the ROM 112M of this embodiment is arranged to store a program code 112C, and the microprocessor 112 is arranged to execute the program code 112C to control the access of the flash memory 120. Note that, in some examples, the program code 112C may be stored in the RAM 116 or any type of memory. Further, the control logic circuit 114 may be arranged to control the flash memory 120, and may comprise an encoder 132, a decoder 134, a randomizer 136, a de-randomizer 138 and other circuits. The transmission interface circuit 118 may conform to a specific communications specification (e.g. Serial Advanced Technology Attachment (Serial ATA, or SATA) specification, Peripheral Component Interconnect (PCI) specification, Peripheral Component Interconnect Express (PCIe) specification, UFS specification, etc.), and may perform communications according to the specific communications specification, for example, perform communications with the host device 50 for the memory device 100, where the host device 50 may comprise the corresponding transmission interface circuit conforming to the specific communications specification, for performing communications with the memory device 100 for the host device 50.

In this embodiment, the host device 50 may transmit host commands and corresponding logical addresses to the memory controller 110 to access the memory device 100. The memory controller 110 receives the host commands and the logical addresses, and translates the host commands into memory operating commands (which may be simply referred to as operating commands), and further controls the flash memory module 120 with the operating commands to perform reading, writing/programing, etc. on memory units (e.g. pages) having physical addresses within the flash memory module 120, where the physical addresses correspond to the logical addresses. When the flash memory controller 110 perform an erase operation on any flash memory chip 122-n of the plurality of NV memory elements 122-1, 122-2, . . . , and 122-N (in which "n" may represent any integer in the interval [1, N]), at least one block of multiple blocks of the flash memory chip 122-n may be erased, where each block of the blocks may comprise multiple pages (e.g. data pages), and an access operation (e.g. reading or writing) may be performed on one or more pages.

Figure 2:
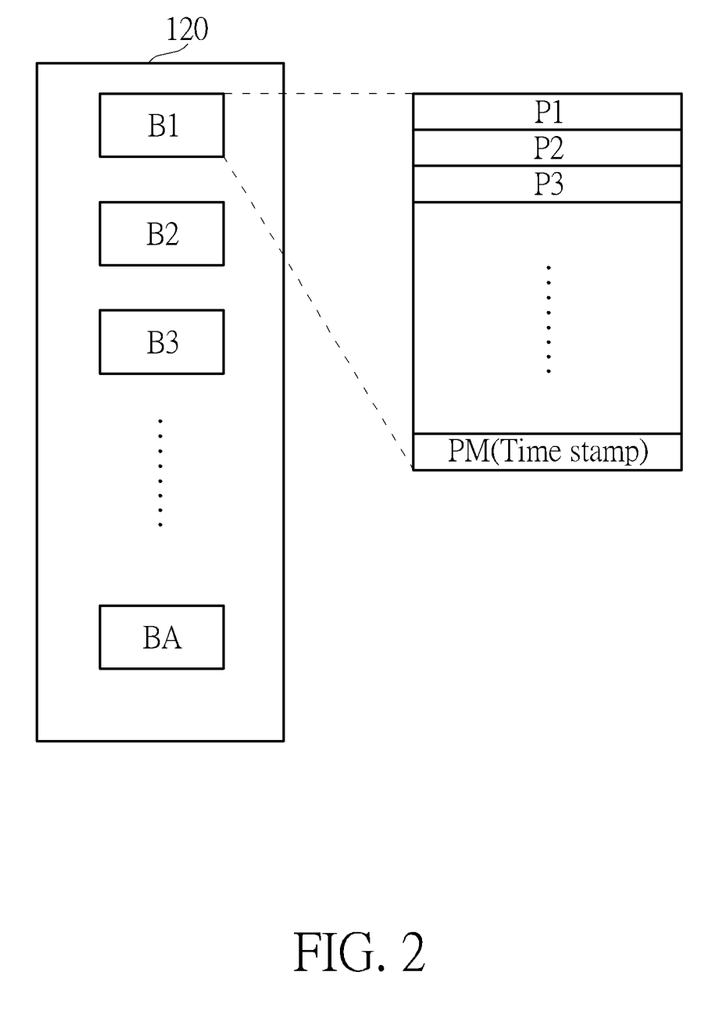
FIG. 2 is a diagram illustrating the flash memory module according to one embodiment of the present invention.

FIG. 2 is a diagram illustrating the flash memory module 120 according to one embodiment of the present invention. As shown in FIG. 2, the flash memory module 120 comprises a plurality of blocks such as A pages B1-BA, wherein each of the blocks B1-BA comprises a plurality of pages such as M pages P1-PM. In addition, when the flash memory controller 110 writes data into a block such as the block B1, the data is sequentially written into the pages P1-PM, and a time stamp representing the write time is also written into a last page PM of the block B1.

Figure 3:
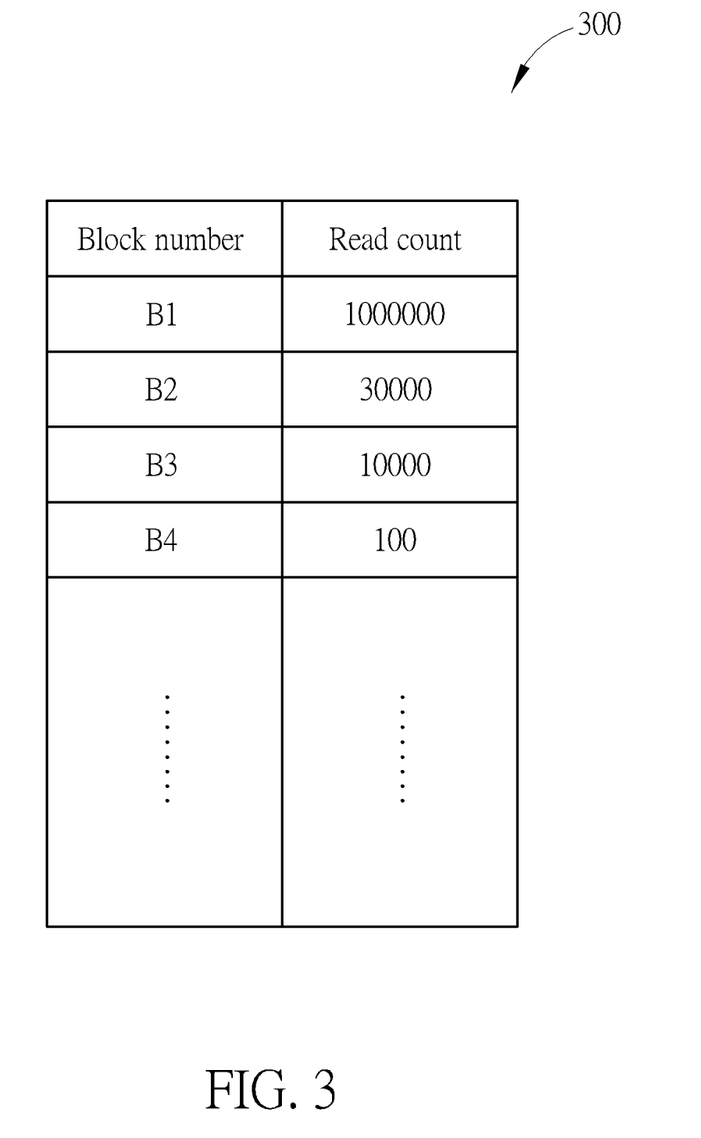
FIG. 3 is a diagram illustrating a read count table according to one embodiment of the present invention.

The flash memory controller 110 has a read count table that is temporarily stored in the RAM 116. FIG. 3 is a diagram illustrating a read count table 300 according to one embodiment of the present invention. As shown in FIG. 3, the read count table 300 records sequence numbers of the blocks B1-BA and the corresponding read counts, wherein each read count is a number of times that data is read from the corresponding memory block.

According to the previous knowledge, the higher the read count of the block, the more serious the phenomenon of threshold voltage shift will be. However, after performing many tests on the flash memory module 120, the applicant found that reading the block slowly will cause a serious threshold voltage shift, while reading the block frequently has a slight threshold voltage shift. Therefore, based on the characteristics of the flash memory module 120 measured above, the applicant proposed a method for controlling the flash memory module 120, which can effectively determine the block (s) that will have serious threshold voltage shift, to avoid subsequent possible reading problems.

Figure 4:
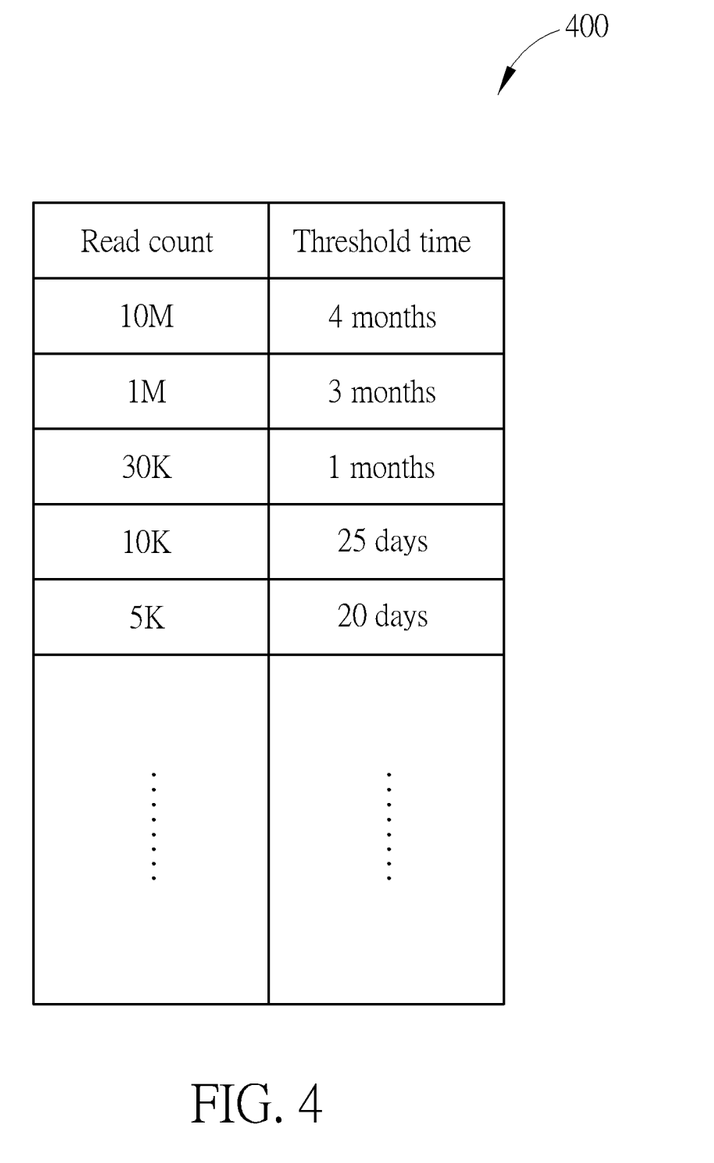
FIG. 4 is a diagram illustrating a read count and threshold time mapping table according to one embodiment of the present invention.

Specifically, the flash memory controller 110 establishes a read count and threshold time mapping table based on the measurement results, wherein the read count and threshold time mapping table is temporarily stored in the RAM 116. FIG. 4 is a diagram illustrating a read count and threshold time mapping table 400 according to one embodiment of the present invention. As shown in FIG. 4, the read count and threshold time mapping table 400 comprises a plurality of read count and corresponding threshold time, for example, ten million read count corresponds to four months, one million read count corresponds to three months, thirty thousand read count corresponds to one month, . . . etc. . . . It is noted that the values shown in FIG. 4 are for illustrative, not a limitation of the present invention. As long as the more reading count correspond to a longer threshold time, the values in the table may be determined according to the measurement results.

Figure 5:
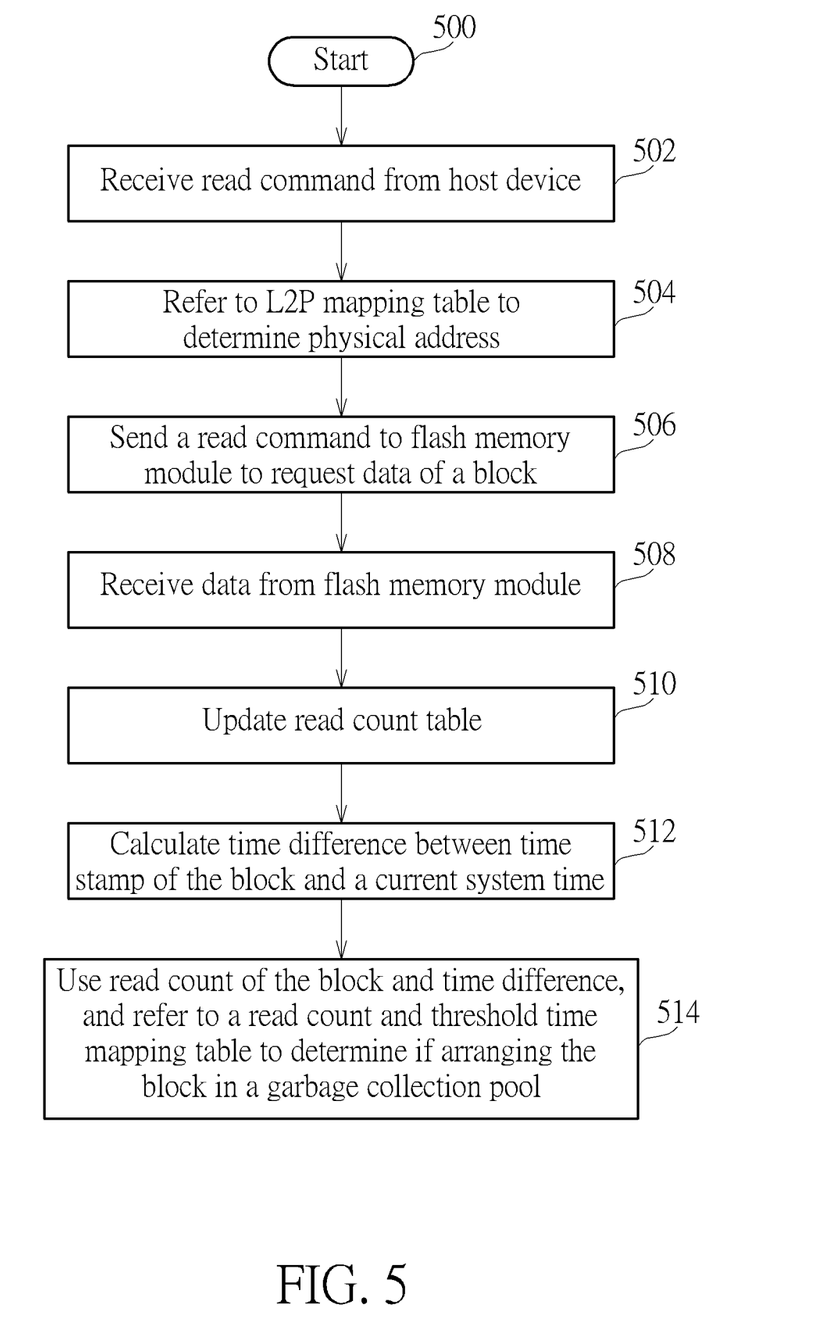
FIG. 5 is a flowchart of a control method of a memory device according to one embodiment of the present invention.

FIG. 5 is a flowchart of a control method of the memory device 100 according to one embodiment of the present invention. In Step 500, the flow starts, and the memory device 100 is powered on. In Step 502, the flash memory controller 110 receives a read command including a logical address from the host device 50, wherein the read command requests data corresponding to the logical address. In Step 504, after receiving the read command from the host device 50, the microprocessor 112 refers to a logical address to physical address mapping table to determine a physical address corresponding to the logical address in the read command, wherein the physical address comprise a block address (block number) and a page address. In Step 506, the microprocessor 112 sends a read command including the physical address to the flash memory module 120 via the control logic circuit 114. In Step 508, the flash memory module 120 reads data within one or more pages of a block with the physical address, and further reads a time stamp within the block, and transmits the data and the time stamp to the flash memory controller 110. In Step 510, after receiving the data and the time stamp from the flash memory module 120, the microprocessor 112 updates the read count table 300 according to the physical address obtained in Step 504. Specifically, if the physical address obtained in Step 504 includes the block B1, the microprocessor 112 updates the read count table by increasing the read count of the block B1 by one.

In Step 512, the microprocessor 112 captures a system time from the host device 50, that is the microprocessor 112 can receive a current system time from the host device 50 via a specific pin, or the microprocessor 112 sends a request to the host device 50 to ask the current system time. Then, the microprocessor 112 calculates a time difference between the current system time and the time stamp. In Step 514, the microprocessor 112 uses the updated read count of the block in Step 510 and the calculated time difference obtained in Step 512, and refers to the read count and threshold time mapping table 400 to determine if arranging the block in a garbage collection pool. Specifically, referring to FIG. 4, if the updated read count of the block B1 is above ten million, the threshold time "four months" corresponding to the ten million read count is selected. If the time difference between the current system time and the time stamp of the block B1 reaches four months, the block B1 is arranged in the garbage collection pool, that is valid data within the block B1 will be moved to another block when the memory device 100 has an idle state (i.e., the flash memory controller 110 does not receive read/write command from the host device 50). If the updated read count of the block B1 is above ten million, but the time difference between the current system time and the time stamp of the block B1 does not reach four months, the block B1 is not arranged in the garbage collection pool.

In the embodiment shown in FIG. 5, because the flash memory controller can use the count of the block and the time difference between the current system and the time stamp of the block, and refers to the read count and threshold time mapping table 400 to determine if arranging the block in a garbage collection pool, the block with slow read characteristics (that may have serious threshold voltage shift) will be selected and put in the garbage collection pool, and the block with frequent read characteristics (that may have slight threshold voltage shift) will not be selected for garbage collection. Therefore, the blocks of the flash memory module 120 will have better quality to improve the read performance.

Figure 6:
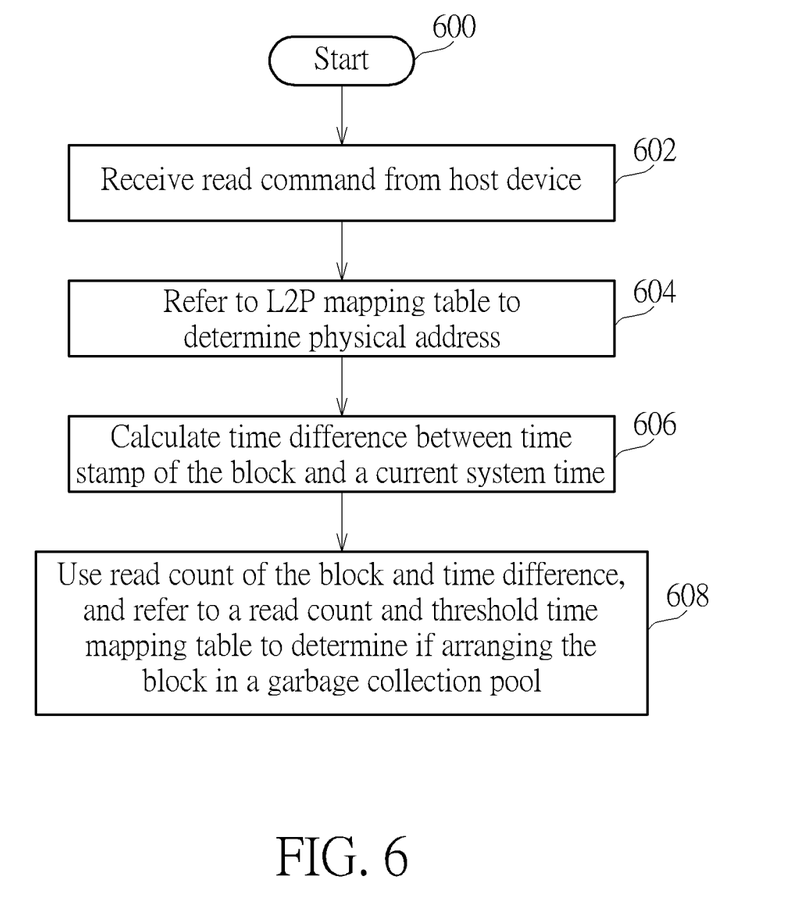
FIG. 6 is a flowchart of a control method of a memory device according to one embodiment of the present invention.

FIG. 6 is a flowchart of a control method of the memory device 100 according to another embodiment of the present invention. In Step 600, the flow starts, and the memory device 100 is powered on. In Step 602, the flash memory controller 110 receives a read command including a logical address from the host device 50, wherein the read command requests data corresponding to the logical address. In Step 604, after receiving the read command from the host device 50, the microprocessor 112 refers to a logical address to physical address mapping table to determine a physical address corresponding to the logical address in the read command, wherein the physical address comprise a block address (block number) and a page address. In Step 606, the microprocessor 112 captures a system time from the host device 50, that is the microprocessor 112 can receive a current system time from the host device 50 via a specific pin, or the microprocessor 112 sends a request to the host device 50 to ask the current system time. In addition, the microprocessor 112 may further establishes a table recording all the blocks and their time stamps, so the microprocessor 112 can refer to this table to obtain the time stamp of the block. Then, the microprocessor 112 calculates a time difference between the current system time and the time stamp. In Step 608, the microprocessor 112 refers to the read count table 300 to obtain the read count of the block, uses the read count of the block and the calculated time difference, and refers to the read count and threshold time mapping table 400 to determine if arranging the block in a garbage collection pool. Specifically, referring to FIG. 4, if the block B2 is to be read, the threshold time "three months" corresponding to the ten million read count is selected. If the read count of the block B2 is between one million and ten million, and the time difference between the current system time and the time stamp of the block B2 reaches three months, the block B2 is arranged in the garbage collection pool, that is valid data within the block B2 will be moved to another block when the memory device 100 has an idle state (i.e., the flash memory controller 110 does not receive read/write command from the host device 50). If the read count of the block B2 is above one million, but the time difference between the current system time and the time stamp of the block B2 does not reach three months, the block B2 is not arranged in the garbage collection pool.

In addition, the threshold time shown in FIG. 4 can be adjusted based on a program/erase (P/E) count of the block. In one embodiment, if the block has a lower P/E count (e.g., P/E count is less than on hundred), the read count and threshold time mapping table 400 can be directly used for the flash memory controller 110 to determine the suitable threshold time for the block that is read in response to the read command; and if the block has a higher P/E count (e.g., P/E count is greater than on hundred), the flash memory controller 110 needs a lower threshold time for the block that is read in response to the read command. For example, if the block that is read in response to the read command has a read count over ten million, and the P/E count of the block is greater than one hundred, the flash memory controller 110 can determine that the threshold time equal to "3.5 months", wherein the threshold time "3.5 months" can be obtained by adjusting the threshold time "four months" in FIG. 4, or can be obtained by another read count and threshold time mapping table exclusively used for the block with higher P/E count.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises a plurality of blocks, each of the plurality of blocks is an erasing unit of the flash memory module, and the control method comprises the steps of:

obtaining a read count of a specific block, wherein the specific block is one of the plurality of blocks, and the read count is a number of times that data is read from the specific block;

obtaining a time stamp of the specific block, wherein the time stamp is a write time of the specific block;

calculating a time difference between a current system time and the time stamp of the specific block;

selecting a threshold time from a read count and threshold time mapping table according to the read count;

adjusting the threshold time to be lower in response to a program/erase count of the specific block exceeding a predetermined value, to generate an adjusted threshold time; and comparing the time difference with the adjusted threshold time to determine whether to arrange the specific block in a garbage collection pool.

2. The control method of claim 1, wherein the step of comparing the time difference with the adjusted threshold time to determine whether to arrange the specific block in a garbage collection pool comprises:

in response to the time difference reaching the adjusted threshold time, arranging the specific block in the garbage collection pool; and in response to the time difference not reaching the adjusted threshold time, not arranging the specific block in the garbage collection pool.

3. The control method of claim 2, wherein the read count and threshold time mapping table comprises a plurality of read counts and corresponding threshold times, and the more reading count correspond to the longer threshold time.

4. The control method of claim 1, further comprises:

receiving a read command from a host device, wherein the first read command comprises a logical address; and using the logical address and referring to a logical address to physical address mapping table to determine a physical address comprising a block address of the specific block; and wherein the step of obtaining the read count of the specific block comprises:

referring to a read count table to determine the read count of the specific block.

5. The control method of claim 1, further comprises:

receiving a first read command from a host device, wherein the first read command comprises a logical address;

using the logical address and referring to a logical address to physical address mapping table to determine a physical address comprising a block address of the specific block;

sending a second read command to the flash memory module, wherein the second read command comprise the physical address;

receiving data of the specific block from the flash memory module; and updating a read count table to increase the read count of the specific block by one, to generate an updated read count table; and the step of obtaining the read count of the specific block comprises:

referring to the updated read count table to determine the read count of the specific block.

6. A flash memory controller, wherein the flash memory controller is configured to access a flash memory module, the flash memory module comprises a plurality of blocks, each of the plurality of blocks is an erasing unit of the flash memory module, and the flash memory controller comprising:

a read only memory, configured to store a code;

a microprocessor, configured to execute the code for controlling access of the flash memory module; and wherein the microprocessor is configured to perform the steps of:

obtaining a read count of a specific block, wherein the specific block is one of the plurality of blocks, and the read count is a number of times that data is read from the specific block;

obtaining a time stamp of the specific block, wherein the time stamp is a write time of the specific block;

calculating a time difference between a current system time and the time stamp of the specific block;

selecting a threshold time from a read count and threshold time mapping table according to the read count;

adjusting the threshold time to be lower in response to a program/erase count of the specific block exceeding a predetermined value, to generate an adjusted threshold time; and comparing the time difference with the adjusted threshold time to determine whether to arrange the specific block in a garbage collection pool.

7. The flash memory controller of claim 6, wherein the step of comparing the time difference with the adjusted threshold time to determine whether to arrange the specific block in a garbage collection pool comprises:

in response to the time difference reaching the adjusted threshold time, arranging the specific block in the garbage collection pool; and in response to the time difference not reaching the adjusted threshold time, not arranging the specific block in the garbage collection pool.

8. The flash memory controller of claim 7, wherein the read count and threshold time mapping table comprises a plurality of read counts and corresponding threshold times, and the more reading count correspond to the longer threshold time.

9. The flash memory controller of claim 6, further comprises:

receiving a read command from a host device, wherein the first read command comprises a logical address; and using the logical address and referring to a logical address to physical address mapping table to determine a physical address comprising a block address of the specific block; and wherein the step of obtaining the read count of the specific block comprises:

referring to a read count table to determine the read count of the specific block.

10. The flash memory controller of claim 6, further comprises:

receiving a first read command from a host device, wherein the first read command comprises a logical address;

using the logical address and referring to a logical address to physical address mapping table to determine a physical address comprising a block address of the specific block;

sending a second read command to the flash memory module, wherein the second read command comprise the physical address;

receiving data of the specific block from the flash memory module; and updating a read count table to increase the read count of the specific block by one, to generate an updated read count table; and the step of obtaining the read count of the specific block comprises:

referring to the updated read count table to determine the read count of the specific block.

11. A memory device, comprising:

a flash memory module, wherein the flash memory module comprises a plurality of blocks, and each of the plurality of blocks is an erasing unit of the flash memory module; and a flash memory controller, configured to access the flash memory module;

wherein the flash memory controller is configured to perform the steps of:

obtaining a read count of a specific block, wherein the specific block is one of the plurality of blocks, and the read count is a number of times that data is read from the specific block;

obtaining a time stamp of the specific block, wherein the time stamp is a write time of the specific block;

calculating a time difference between a current system time and the time stamp of the specific block;

selecting a threshold time from a read count and threshold time mapping table according to the read count;

adjusting the threshold time to be lower in response to a program/erase count of the specific block exceeding a predetermined value, to generate an adjusted threshold time; and     comparing the time difference with the adjusted threshold time to determine whether to arrange the specific block in a garbage collection pool.

12. The memory device of claim 11, wherein the step of comparing the time difference with the adjusted threshold time to determine whether to arrange the specific block in a garbage collection pool comprises:

in response to the time difference reaching the adjusted threshold time, arranging the specific block in the garbage collection pool; and     in response to the time difference not reaching the adjusted threshold time, not arranging the specific block in the garbage collection pool.

13. The memory device of claim 12, wherein the read count and threshold time mapping table comprises a plurality of read counts and corresponding threshold times, and the more reading count correspond to the longer threshold time.

14. The memory device of claim 11, further comprises:

receiving a read command from a host device, wherein the first read command comprises a logical address; and using the logical address and referring to a logical address to physical address mapping table to determine a physical address comprising a block address of the specific block; and wherein the step of obtaining the read count of the specific block comprises:

referring to a read count table to determine the read count of the specific block.

15. The memory device of claim 11, further comprises:

receiving a first read command from a host device, wherein the first read command comprises a logical address;

using the logical address and referring to a logical address to physical address mapping table to determine a physical address comprising a block address of the specific block;

sending a second read command to the flash memory module, wherein the second read command comprise the physical address;

receiving data of the specific block from the flash memory module; and updating a read count table to increase the read count of the specific block by one, to generate an updated read count table; and the step of obtaining the read count of the specific block comprises:

referring to the updated read count table to determine the read count of the specific block.

\* \* \* \* \*